Oct. 15, 1929.  A. P. JURGENSEN  1,732,018
AIR CELL PIPE COVERING
Filed Jan. 30, 1929  4 Sheets-Sheet 1
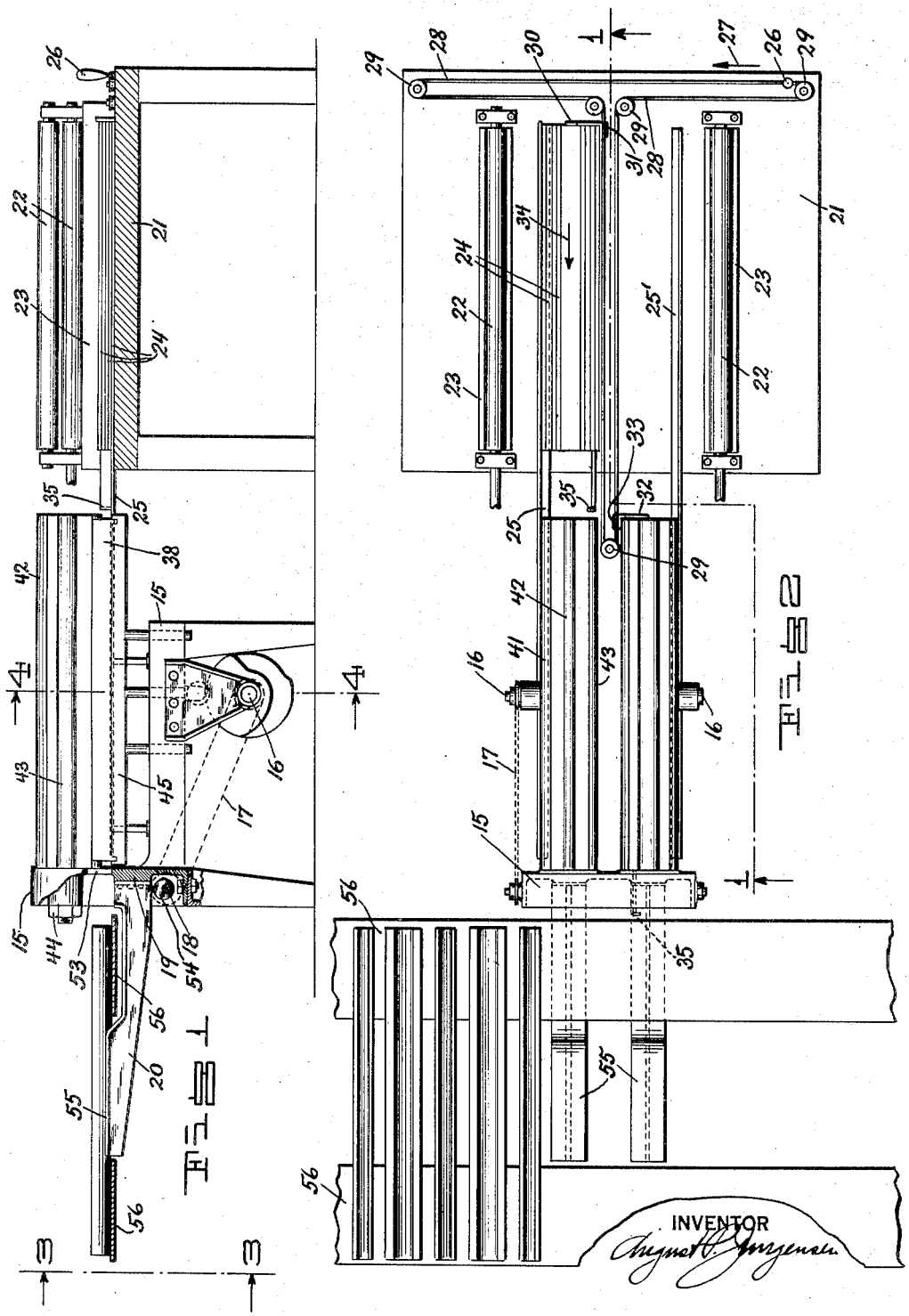
INVENTOR

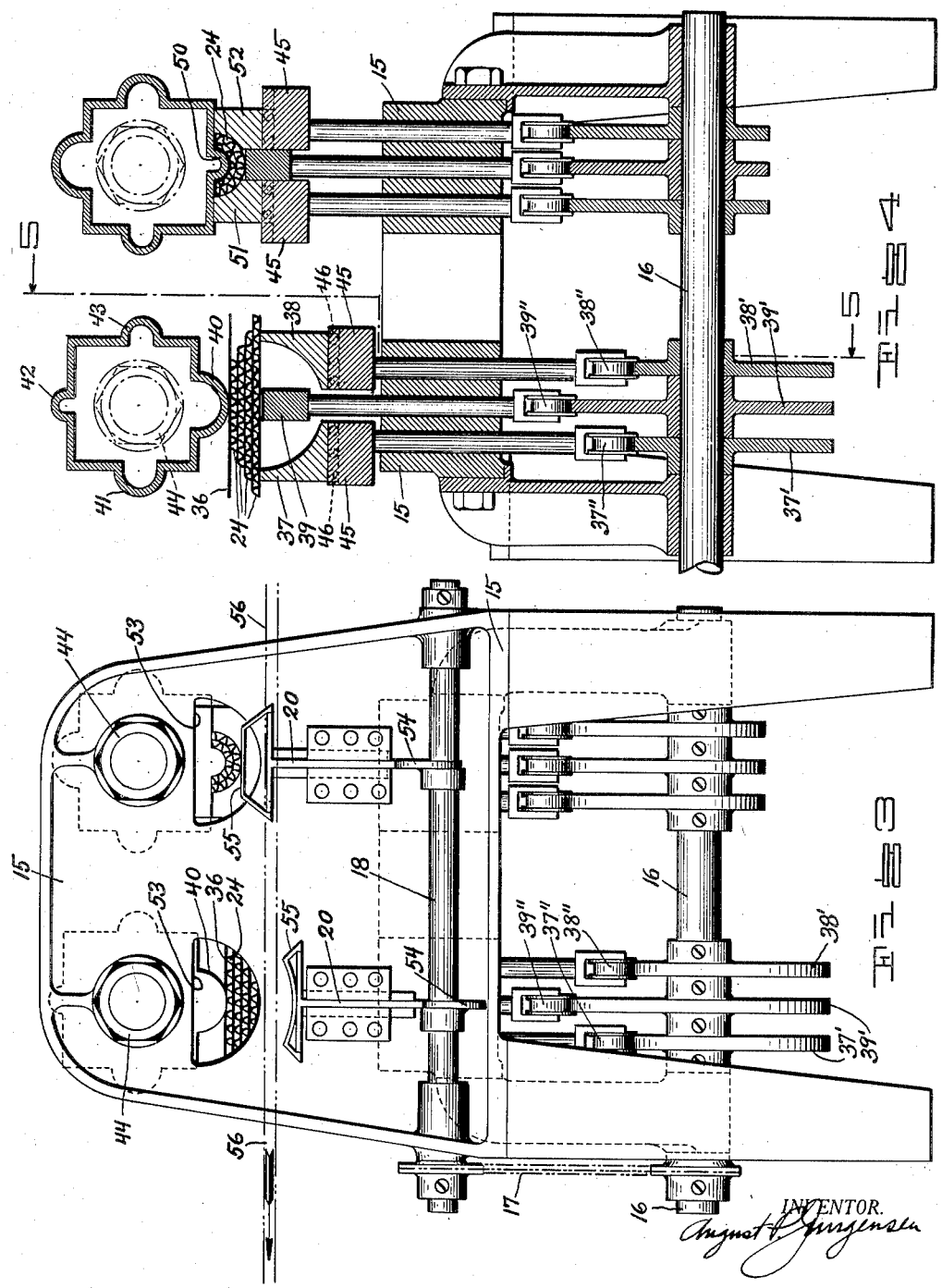

Oct. 15, 1929.  A. P. JURGENSEN  1,732,018
AIR CELL PIPE COVERING
Filed Jan. 30, 1929  4 Sheets-Sheet 3
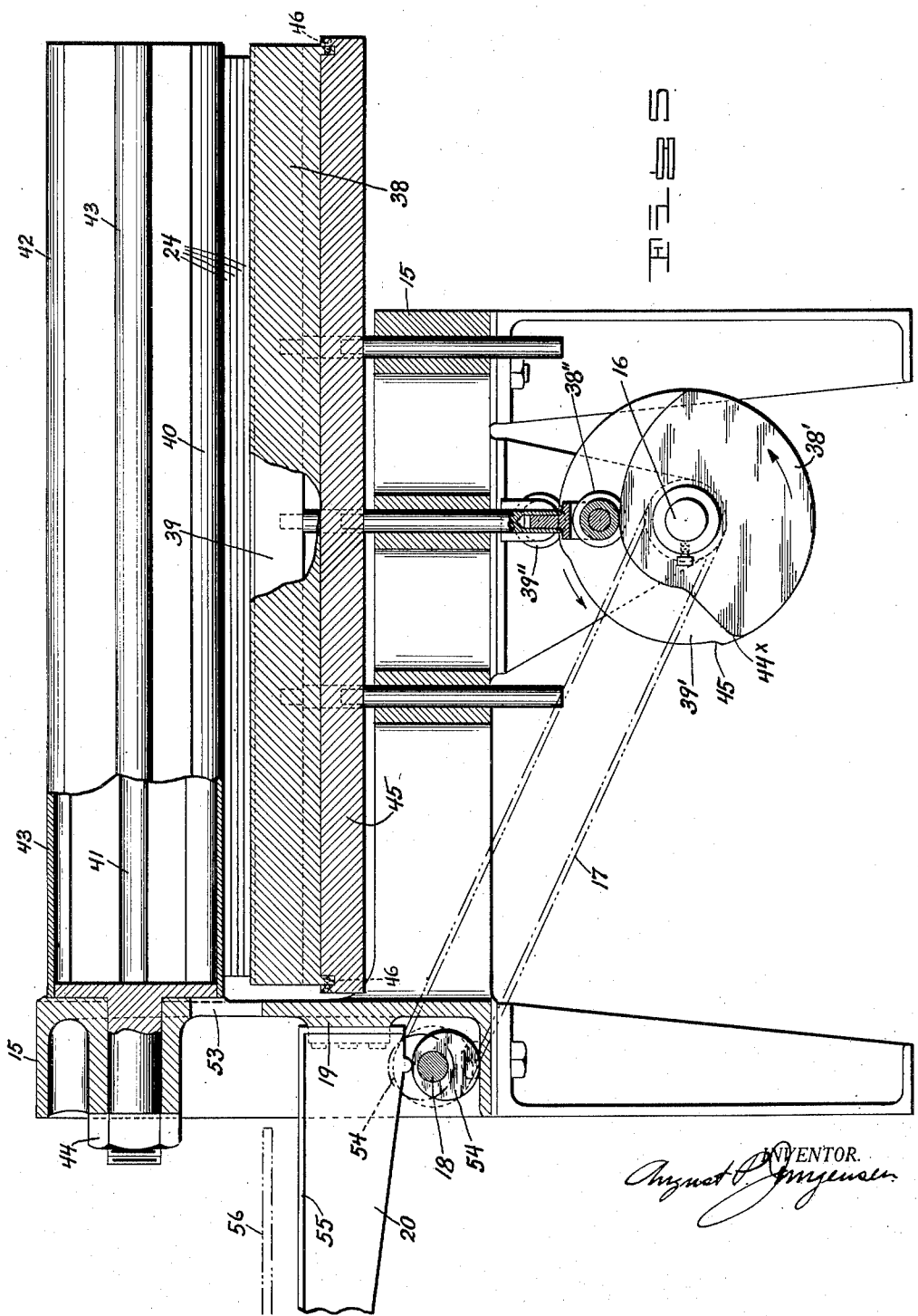

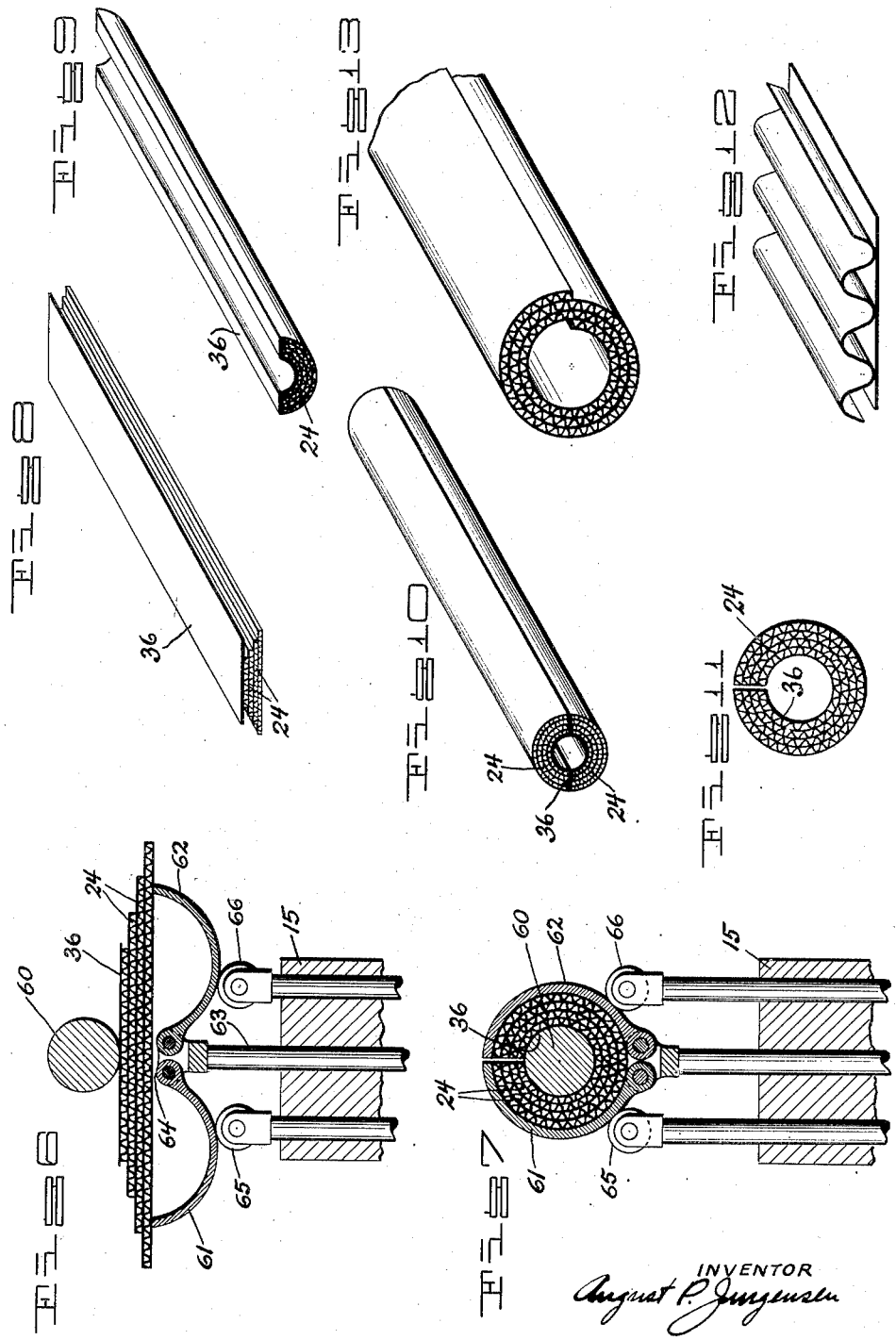

Patented Oct. 15, 1929

1,732,018

UNITED STATES PATENT OFFICE

AUGUST P. JURGENSEN, OF PHILADELPHIA, PENNSYLVANIA, ASSIGNOR TO CONCENTRIC AIR CELLS AUTOMATIC COMPANY, OF PHILADELPHIA, PENNSYLVANIA, A CORPORATION OF DELAWARE

AIR-CELL PIPE COVERING

Application filed January 30, 1929. Serial No. 336,163.

My invention relates to improvements in pipe coverings, more particularly the type used for heat insulating purposes.

One of the principal objects of this invention is to produce at low labor cost pipe covering sections of even cross-sectional strength made of concentric layers of corrugated asbestos paper.

Another object is to eliminate the handling of pipe covering sections while in the process of moulding and drying.

Other objects will be specifically referred to in the specification.

Pipe covering sections at the present time are made by rolling one sheet of corrugated asbestos paper around a mandrel, using silicate of soda or similar products to secure adhesion; by this method it is of course impossible to produce a round or cylindrical finish to pipe covering sections, as there will always be a "lap" or "joint" where the corrugated paper ends as well as where it started. Many attempts have been made to overcome this objectionable feature, but even in the best made pipe coverings the spiral effect is very noticeable.

In the drawings, which are to be taken as part of this specification I have illustrated in Fig. 1 a side elevation of one of the preferred applications of my invention, partly shown in cross-section.

Fig. 2 is a view looking from top to bottom at Fig. 1.

Fig. 3 is a view on the line 3—3 at Fig. 1 and looking in the direction of the arrows.

Fig. 4 is a cross-sectional view on the line 4—4 at Fig. 1 looking in the direction of the arrows.

Fig. 5 is a cross-section taken on the line 5—5 of Fig. 4 looking in the direction of the arrows.

Fig. 6 is a fragmentary view of a modification.

Fig. 7 is a view similar to Fig. 6 showing the working part in different positions.

Fig. 8 is a view showing the corrugated paper, cut to size ready for the moulding unit.

Fig. 9 is a view of the corrugated paper after it has been moulded.

Fig. 10 is a view showing two moulded sections assembled.

Fig. 11 is a view showing the finished product from moulds shown in Figs. 6–7.

Fig. 12 shows type of corrugated asbestos paper used, backed on one side.

Fig. 13 shows the conventional method of rolling a section spirally heretofore employed.

Now referring to Figs. 1–2, 15 is a frame or main support, carrying by means of suitable bearings shaft 16, which, through chain 17 rotates shaft 18. Frame 15 also provides a slide-bearing 19 for a reciprocating bracket 20. Another frame 21 carries rollers 22, the lower ones of which are partly submerged in receptacles 23 containing silicate of soda or other suitable binding or adhesive substance. Corrugated asbestos paper 24 shown in Fig. 2 placed in angle frame 25 has been passed between rollers 22 receiving a surface application of silicate of soda. If handle 26 is advanced in the direction of arrow 27 from one extreme position to another, the endless cord 28 passing over rollers 29 and securedly fastened to angle strip 30 at 31 and angle strip 32 at 33, the angle strip 30 will push the corrugated paper 24 in the direction of arrow 34 into the moulding unit to be hereinafter more fully described. At the same time angle strip 32 will move in opposite direction to, and an equal distance as that of paper 24, thereby placing angle strip 34 in a position to have corrugated paper placed in the space between angle strip 32 and angle frame 25′ ready to be advanced into the moulding unit as angle strip 30 is returned. These operations alternate in such a way that, while one pipe covering section is being made in the mould, the paper for the next one is being placed in the frame outside of the moulding unit. Although the handle 26 has been shown as being manually operated, a crank-shaft, camshaft or any other well known mechanical device may be used to make this action automatic. The extension fingers 35 are attached to the same frame supporting the paper 24 and angle strips 30—32. These fingers 35 push the previously made corrugated section out of the moulding unit, while asbestos paper for the next section is being fed into the moulding unit.

Now referring to Figs. 3, 4 and 5, and particularly Fig. 4, the corrugated paper 24 shown in four-plys and also core lining asbestos paper 36 are shown supported by external moulds 37, 38 and 39. Internal moulds 40, 41, 42 and 43 are shown as welded into one structure and rotatably mounted to the frame 15 by means of locknut 44. These internal moulds are held in a permanent position when the locknut 44 is tightened. External moulds 37, 38 and 38 are vertically actuated by means of cams 37', 38' and 39' through rollers 37'', 38'' and 39'' and suitable connecting rods.

In the moulding operation shown in the drawings, cam 39' has just raised external mould 39 to a position where it exerts a slight pressure on corrugated paper 24 against internal mould 40. This clamping operation prevents any side sliding of corrugated paper 24 before external moulds 37—38, following mould 39 in an upward direction are raised by cams 37''—38', shaping the corrugated paper into a complete semi-circular section. The external moulds are held in their upward position long enough to let the silicate of soda on the paper set and retain its moulded shape. A steam pipe or other heating means may be arranged in the hollow space formed by internal moulds 40, 41, 42 and 43 to facilitate the hardening of the silicate of soda. After cams 37'—38' have rotated to a position where the parts of the cams indicated by reference character 44× (Fig. 5) are in contact with the rollers 37''—38'' moulds 37—38 drop quickly as will be evident from the shape of the cams, leaving the moulded product rest on top of mould 39. When the part of cam 39' indicated by reference character 45 (following shortly after the last described operation) reaches the roller 39'' a short drop of mould 39 will occur releasing entirely the moulded section and leaving it free to be ejected by finger 35 as the next lot of corrugated paper is fed into the moulds. When a different size of pipe covering than that just described is to be made lock nut 44 is loosened and the internal mould unit is turned till the proper internal mould is in the position now occupied by mould 40—for example, if mould 42 is to be used the internal mould unit is rotated 180 degrees, then the lock nut 44 is tightened, external moulds 37—38 are removed and two smaller external moulds are fastened to the brackets 45 by means of screws 46.

Another moulding unit is shown parallel to the unit previously described in Fig. 4, in this unit internal mould 50 is shown in close proximity to external moulds 51—52 with asbestos paper 24 already moulded into shape. It will be noted from the drawing that when the cams actuating this moulding unit are in an upward position on shaft 16, the cams actuating moulds 37—38 are in a downward position. Through this arrangement asbestos paper is fed into one unit while the other is moulding a section and vice versa. Only two units are shown although a series of moulding units may be in operation at the same time. The mechanism for receiving and conveying the moulded sections after they are ejected from the moulds operates as follows:

Fingers 35 eject the moulded sections through openings 53 of the main frame 15 (see Figs. 1, 2, 3 and 5) reciprocating brackets 20 move alternately up and down, actuated by eccentrics 54 fastened on shaft 18, which in turn is driven from shaft 16 through chain 17. On brackets 20 are fastened trays 55 adapted to receive the moulded sections as they are ejected. One of the trays 55 is shown above endless belts 56, which move in the direction of the arrow. When this tray has received one pipe covering section it moves downward because of its contact with one of the eccentrics 54, through reciprocating bracket 20 and as it passes below the level of the endless belt 56, the pipe covering section is picked up by the endless belt 56 and removed to a suitable dryer. As this tray moves down the other tray moves up ready to receive the next pipe covering section. These mechanisms are interlocked and function entirely automatically.

Figs. 6 and 7 show a modification, in which the corrugated paper 24 and core lining paper 36 have been fed into the moulding unit (Fig. 6) directly under the permanent mandrel 60 and resting on external moulds 61—62 at outer edge. Cam connecting rod 63 is advanced upwards until a slight pressure clamps the corrugated paper 24 between the surface indicated by reference character 64 and the mandrel 60. After the paper is held firmly, the rollers 65—66 advance upwards moulding the corrugated paper into a pipe covering section as shown in Fig. 7. After the external moulds 61—62 have returned to the position shown in Fig. 6, the pipe covering section is ready to be removed from the mandrel 60 in an axial direction.

Fig. 11 shows the moulded section after it has been removed from the mandrel 60.

In Fig. 8 I have shown the way the paper 24 and core lining 36 are arranged before feeding same into the moulding unit described in Figs. 3 and 4.

Fig. 9 shows paper 24 and core lining 36 after they have been moulded into a section.

Fig. 10 shows the two halves forming a complete pipe covering section. Canvass or other suitable material is pasted around these sections to hold them together.

Fig. 12 represents the type of corrugated asbestos paper used.

Fig. 13 shows the way pipe covering sections are manufactured at the present time. One sheet of corrugated paper is rolled spirally around the mandrel and retains its shape by means of a suitable adhesive. After the adhesive has set, the mandrel is removed and the section is parted along an axial line and placed around a steam pipe. It will be noted that it is impossible to manufacture a round section in this manner and it is also impossible to secure a cross section of even strength.

It will thus be seen from Figures 3, 4, 6 and 7, that I have devised a novel air cell pipe covering which is moulded from one or more sheets of heat insulating material, in lieu of being wound or continuously wrapped around a core or mandrel and that my novel air cell pipe covering is initially produced with a longitudinal slit or in longitudinal sections as seen in Figures 10 and 11, in lieu of being formed integral and continuous and being subsequently split or cut into sections (see Fig. 13).

It will further be seen that the longitudinal edges of my novel split or sectional pipe covering are juxtaposed and parallel and are disposed in the same cylindrical plane in lieu of overlapping at the beginning and end of a conventional spirally formed (and then cut or split) pipe covering illustrated in Figure 13.

Only by a process such as I have described, to wit, that of moulding one or more sheets of heat insulating material is it possible to obtain the product illustrated in Figures 7, 10 and 11, with the longitudinal edges of the initially split or cut product parallel, juxtaposed and in the same cylindrical plane, since all other processes involving the continuous wrapping or winding of such material around a mandrel will necessarily result in the product shown in Figure 13 having overlapping inner and outer ends, and I claim to be the first to produce pipe covering formed by moulding one or more sheets of heat insulating material around a core to form the novel product shown in Figures 7, 9 and 10, my novel method being carried out by the novel apparatus I have shown and described.

It is further to be understood that my novel air-cell pipe covering is universally applicable to all heating systems or for the insulation of flues, stacks, exhaust pipes or any other conduits which are subject to being heated through regular normal use.

It is further to be understood that my invention is not limited to the process of moulding a plurality of sheets of heat insulating material as illustrated (since the number of sheets used depends on the thickness of the finished product desired) but that a single sheet of the desired thickness, or any other desired plastic or pliable substance may be moulded to forms desired by means of my novel apparatus and process.

It is still further pointed out that while the use of corrugated paper in order to afford air-cell insulation is desirable, it is equally possible to use the flat type of an insulating sheet when such use is deemed advisable.

Having thus described my invention, what I claim as new and desire to secure by Letters Patent is:—

1. An apparatus for forming insulating air cell pipe covering, comprising an inner stationary cylindrical mould, an outer movable sectional mould including a movable clamping plunger, and means for progressively clamping said plunger and said outer sectional mould against said inner mould to impart a longitudinally split cylindrical form to a suitable pliable material, previously placed in said mould.

2. An apparatus for forming pipe covering, comprising an inner stationary and an outer movable mould, means for feeding a suitable pliable material into said outer mould, and means below and on each side of said outer mould for clamping the latter against said inner mould to produce a longitudinally split cylindrical product composed of nested, concentric, split cylinders having their longitudinal edges, aligning, parallel, juxtaposed and in the same cylindrical plane.

3. An apparatus for forming a pipe covering, comprising means for automatically cementing sheets of pliable heat resisting material, an inner cylindrical core, an outer sectional mould, means for feeding said superimposed cemented sheets into said mould, means for clamping said mould against said core to produce a longitudinally split cylindrical product composed of nested, concentric, split cylinders cemented together and having their longitudinal edges contiguous, parallel, juxtaposed, and in the same cylindrical plane.

4. An apparatus for forming insulating, air cell pipe covering, comprising an inner cylindrical mould, an outer sectional mould, means for feeding a plurality of cemented superimposed sheets of pliable heat resisting material into said outer mould, means for clamping said outer mould against said inner mould to produce a longitudinally split cylindrical product composed of sectional, nested cylinders having their longitudinal edges aligning, parallel, and in the same cylindrical plane.

5. In a device of the character stated, an inner stationary mould, an outer movable, sectional mould, means for feeding superimposed, cemented sheets of pliable heat insulating and resisting material into said outer mould, means for clamping said outer mould against said inner mould for a predetermined length of time and means for releasing said outer mould.

6. In a device of the character stated, an inner cylindrical core, an outer sectional mould, means for feeding a plurality of sheets of pliable heat resisting material into said outer mould, means for clamping said mould against said core, means for releasing said mould and means for ejecting the moulded sheets from said mould.

7. In a device of the character stated, an upper stationary core, a lower vertically movable support, a sectional mould hinged to the upper end of said support, means for feeding cemented superimposed sheets of heat insulating material into said sectional mould, means for elevating said support to clamp said sheets against said core and means for clamping said sectional mould about said core.

8. In a device of the character stated, an upper stationary core, a vertically movable support below said core, a lower sectional mould hinged to the upper end of said support, means for feeding cemented superimposed pliable sheets of heat resisting material into said sectional mould, means for initially elevating said support to clamp said sheets against said core, means for subsequently and simultaneously closing said lower sectional mould about said sheets and said core, and means for lowering said support and said sectional mould from operative contact with said core.

9. In a device of the character stated, an upper cylindrical core, a vertically movable support below said core, a sectional mould hinged to the upper end of said support, means for feeding sheets of pliable material into said sectional mould, means for initially elevating said support into contact with said core, means for subsequently and simultaneously closing said sectional mould about said sheets and said core, means for lowering said core and said mould from operative contact with said core and means for ejecting the moulded sheets from said mould.

10. In a device of the character stated, an upper cylindrical core, a vertically movable support below said core, a sectional mould hinged to the upper end of said support, means for automatically feeding pliable material into said sectional mould, means for automatically elevating said support into contact with said core, automatic means for subsequently and simultaneously closing said sectional mould about said sheets and said core, for a predetermined length of time, means for automatically lowering said mould from operative contact with said core and automatic means for ejecting the moulded sheets from said mould.

11. In a device of the character stated, an inner stationary mould, an outer movable, sectional mould, means for feeding sheets of pliable heat insulating and resisting material into said outer mould, means for clamping said outer mould against said inner mould for a predetermined length of time, means for releasing said outer mould, and means for ejecting the moulded sheets from said mould.

Signed at Philadelphia in the county of Philadelphia and State of Pennsylvania this 28th day of January, A. D. 1929.

AUGUST P. JURGENSEN.